United States Patent [19]

Switsen

[11] Patent Number: 4,951,315
[45] Date of Patent: Aug. 21, 1990

[54] VIDEO SIGNAL NOISE EVALUATION AND REMOVAL CIRCUIT

[76] Inventor: Henry N. Switsen, 17236 Bircher St., Granada Hills, Calif. 91344

[21] Appl. No.: 292,424

[22] Filed: Dec. 30, 1988

[51] Int. Cl.$^5$ ............................................. H04N 7/167
[52] U.S. Cl. ...................................... 380/15; 358/153; 358/155; 358/167; 358/177; 380/10
[58] Field of Search ............... 358/155, 157, 167, 177, 358/153

[56] References Cited

U.S. PATENT DOCUMENTS

| | | | |
|---|---|---|---|
| 3,313,880 | 4/1967 | Bass | 380/15 |
| 3,989,887 | 11/1976 | Murphy | 380/7 X |
| 4,488,183 | 12/1984 | Kinjo | 380/7 X |
| 4,568,974 | 2/1986 | den Toonder et al. | 380/15 |
| 4,631,603 | 12/1986 | Ryan | 380/15 X |
| 4,682,359 | 7/1987 | Mistry | 3890/7 |
| 4,716,588 | 12/1987 | Thompson et al. | 380/15 X |
| 4,725,882 | 2/1988 | Sato et al. | 380/15 X |

Primary Examiner—Stephen C. Buczinski
Assistant Examiner—Bernarr Earl Gregory

[57] ABSTRACT

By extracting a high frequency A.C. signal from the tips of the horizontal sync pulses, and sensing for the presence of pulses occurring at abnormal times, an extremely simple method of both measuring and removing unwanted noise and noise pulses in a base band video signal is disclosed. This noise appears in the video signal as the result of poor transmission or reception, low quality recordings, playback tracking errors, defective recordings, and physically damaged video tapes. Also, extra pulses have been intentionally added to some video signals to disrupt the agc circuits of a video recorder and prevent the proper recording of that signal. The invention will identify and remove them as well.

12 Claims, 2 Drawing Sheets

VIDEO SIGNAL NOISE EVALUATION AND REMOVAL CIRCUIT

BACKGROUND OF THE INVENTION

Noise in video signals falls mainly into two broad categories.

The first type is the noise generally referred to as the signal to noise ratio of the signal, and occurs more or less uniformly throughout the signal. In an audio system, this would be equivalent to the familiar background hiss.

In this disclosure "signal to noise ratio" type of noise will be referred to as "spectrum" noise, to distinguish it from the second type of noise, "impulse" noise.

Impulse noise affects mostly only small sections of a video signal, while surrounding portions of that video signal generally remain unaffected and "clean". In an audio system, this would be equivalent to static.

Impulse noise also tends to be more severe than spectrum noise, and although it is of short duration, it often totally destroys all frequencies of the video signal for the duration of its occurrence.

When noise enters a video system, the result is a deterioration of picture quality. Both types of noise cause a loss of information by distorting a portion of the desired video signal. Obviously, the less noise there is in a video system, the better.

Spectrum noise tends to deteriorate the high frequencies of the video signal that carry the fine detail picture information. A result of increasing spectrum noise is a kind of graininess of the resulting picture. As the spectrum noise increases further, the grain becomes more evident in the viewed picture.

To make matters worse, once the signal to noise ratio has been established at a low amplitude level, further amplification of the signal does not improve picture quality, since the noise is amplified right along with the wanted signal.

For this reason, simple field strength and video level meters, which can be purchased at a reasonable price, cannot properly evaluate the QUALITY of a video signal, only its strength.

A quick and economical way to evaluate and "grade" the quality of a video signal would be a good first step to improving the signal, by allowing the checking of video transmission and receiving equipment and cable lines. The present invention will also quickly detect and identify a substandard video tape, detect clogging video heads at a very early stage even before their effect is readily visible, allow a quick "red light-green light" indication of signal quality, assist in both the manual and automatic setting of the playback tracking control properly, and provide a full grading scale from poor to excellent. It works with tape as well as "live" video signals, and also lends itself very well to battery operation, to extend its benefits into "field" applications.

Spectrum noise evaluation is the essence of one embodiment of the present invention.

As to the matter of impulse noise, it mostly makes itself directly visible as light or dark spots and streaks in the viewed picture.

Impulse noise can become indirectly visible when it upsets processing equipment. It is possible for a single pulse of impulse noise lasting only microseconds to upset processing equipment so badly that a loss of picture lasting several seconds occurs. A classic example of this occurs when a single noise pulse upsets the scanning countdown timer in a television receiver, and the picture "rolls" vertically for several seconds before locking back in sync. Similarly, that same single impulse noise pulse can upset the servo locking in a video tape recorder, and cause the video heads to run uncontrolled and out of phase for several seconds before recovering.

The present invention will remove this noise before it can upset the equipment.

Video processing equipment is more likely to be disturbed by impulse noise than by spectrum noise not only because it is more severe, but also because video equipment is controlled more by the low frequency content signals that impulse noise destroys than it is by the high frequency content signals that spectrum noise attacks.

Severe playback tracking errors, defective recordings, and physically damaged video tapes generate impulse noise anywhere within the picture frame, disrupting video equipment processing this corrupted video signal.

If as a result of the signal evaluation that it makes, the invention determines that the video signal contains noise that would disrupt processing equipment, then that noise is automatically removed.

Impulse noise upsets televisions and video recorders, and equipment such as amplifiers, color correctors, and enhancers, as well as equipment that keeps track of frame timing by counting.

When impulse noise is negative going, and approaches the level of the normal horizontal sync pulses, it can cause the automatic gain control circuitry in amplifiers and video recorders to take additional agc readings of the video signal at abnormal times.

When the negative going noise pulses are directly followed by a level that is more positive than the normal back-porch level, they change the perceived horizontal back porch black level, causing processing equipment to falsely interpret this video signal as being larger then it really is, and automaticly reduce its gain to an abnormally low level.

The invention will detect this condition, and remove the noise.

Additionally, extra horizontal sync pulses simulating negative going impulse noise, and companion positive going pulses, have been intentionally added to some video recordings to cause video recorders to have the same kind of problems as described above, and thereby corrupt the recording of the video signal.

The invention will detect this kind of impulse noise also, and remove it.

For the remainder of this disclosure, to avoid duplicate discussion, except where referred to in the text, these intentionally added pulses will be considered together with, and considered as, unwanted impulse noise.

Because they are confined to the normally black area of the vertical interval, the intentionally added pulses can also cause additional problems with television receivers that are not operating quite properly, where the set owner is totally unaware of the existence of any malfunction until these special recordings are viewed on their sets.

Two common faults that suddenly become noticeable when viewing these special recordings are several bright white diagonal lines that run throughout the picture, commonly referred to as RETRACE LINES that can be caused by several different set defects. Also, a pronounced buzzing in the sound can appear.

The retrace lines can be caused of course by a defective part within the vertical blanking circuitry of the television set. They can also be caused by CRT bias controls that have been set too high either inadvertently, or as a routine procedure to extend the usable life of an aging picture tube. Since most of the vertical retrace time is usually at BLACK level, the condition goes totally unnoticed until high levels of white are introduced during the retrace.

As to the buzzing of the sound, this is fairly common to many sets, also due to several defects (including some design), but again, the condition is usually only present for very brief periods such as when some bright lettering is superimposed upon the picture, and as such is generally unnoticed by viewers.

It is not usually noticed until it becomes a more frequent or constant condition as when these special tapes are viewed.

Since the viewing of other tapes or live shows presents no problem, the consumers are being offered differing explanations and solution, many of which lead to an unhappy situation of one kind or another.

The true explanation is far beyond the technical expertise of most lay persons, and a consumer being told to repair an otherwise working television set, or to buy a new one is far from an ideal solution.

One good solution would be the ability to economically remove the offending signal, whether its caused by damaged, scratched, or untrackable video tapes, or is caused by intentionally added pulses, and that is the essence of another embodiment of the present invention.

DESCRIPTION OF THE PRIOR ART

There is no known prior art for removing noise pulses generated by playback tracking errors or tape defects that appear at the video output jack of a video tape machine, or on video signal cable lines.

While measuring the signal to noise ratio of a video signal is known, the present inventor was unable to find any reasonably priced equipment for this, and so developed the present invention for his own use, without any knowledge of the inner workings of any of the prior art. The prohibitive cost of such equipment would indicate that there is no known prior art to grade a video signal for quality in such a simplistic manner.

For these reasons, the discussion of prior art will be confined to the extra pulses that have been intentionally added to a video signal, for which there is knowledge of known prior art.

Several approaches to removing intentionally placed extra sync pulses and restoring the back porch level to an altered video signal are known. They are all plagued with complexity, and operate in the immediate vicinity of the vertical blanking interval, and cannot operate when noise may occur anywhere throughout the entire video frame.

U.S. Patent No. 4,695,901 issued Sept. 22, 1987 describes the method used by the inventor of that encoding system to remove the extra signals which he names as Pseudo-sync pulses for the extra added horizontal sync pulses, and names as AGC pulses for the positive pulses following directly after these Pseudo sync pulses. This patent discloses, as shown in its FIG. 1, some very complex circuitry, with block diagram boxes carrying names such as phase detector & filter, 31-468 khz vco, divide by 2, divide by 525, ram or state detector, sync tip clamper (where it is required that the amplitude of the video be known), and field pulse generator. Also shown are 4 monostable multivibrators, a chroma filter, several assorted gates and operational amplifiers, and a video switcher, whose proper operation depends on precisely controlling both the A.C. and D.C. level of the video signal.

A very complex system indeed.

An article appearing in the Dec. 1987 issue of Radio Electronics magazine pages 49–54 shows a different approach and also contains a section on page 51 describing the shortcomings of still other prior art approaches to removing pulses intentionally added to the vertical blanking interval.

This article shows circuitry containing 9 integrated circuits, with more then 20 circuit functions including crystal oscillator, decade counter, sample and hold circuitry, gated video switching, more then a half dozen operational amplifiers, and many other assorted functions, rivaling the U.S. Pat. No. 4,695,901 system for complexity.

Yet another prior art approach to the task of cleaning up the vertical blanking interval consists of marking the start of the blanking interval by sensing the previous vertical sync pulse and triggering a precision timer to time out at the proper time just prior to the next vertical sync pulse, marking the first area of the signal to be corrected. Then, additional timing circuitry defines the other areas to be corrected, and all of this is interfaced with a series of additional stages and the appropriate circuitry to restore a more normal vertical blanking interval.

Besides its complexity, another major drawback of this approach is the very critical nature of the long time period timer marking the start of the blanking interval. This has to be on the order of a 1 percent timer, and carries with it all of the manufacturing and field maintenance problems associated with requiring that kind of accuracy, including an inherently shorter usable life due to normal circuit aging. This is also a complex and critical system.

By contrast, the disclosure of the present invention will address all of the problems stated and referenced above in a very simple manner, using a minimal number of inexpensive, non critical parts, and it requires no calibration or adjustment after its manufacture, no field maintenance, and no user adjusting.

Another drawback of the prior art approaches is that they are "dumb" or "blind" in their operation. They define three, four, or more limited portions of the video signal both shortly before, during, and shortly after the vertical sync time with complex circuitry, and then blindly strip away everything within those portions, even control signals that it would be desirable to leave undisturbed.

The present invention falls into the category of being a "smart" system. It acts on the entire video signal "intelligently" and ONLY in response to extra noise pulses that are unwanted in that signal.

As a result, all the special signals such as closed captions for the hearing impaired, time codes, frame counters and automatic chroma references such as VIR, etc. are left unaffected, even when they share the same scanning line with noise generated pulses or intentionally placed extra pulses that ARE removed.

Because this invention analyzes the signal dynamically instant by instant, it will correct for playback tracking errors and defective video tape errors anywhere in the entire frame that cause noise pulses and upset the agc and control circuitry of processing equipment.

DESCRIPTION OF THE PREFERRED EMBODIMENTS

Figure 1:
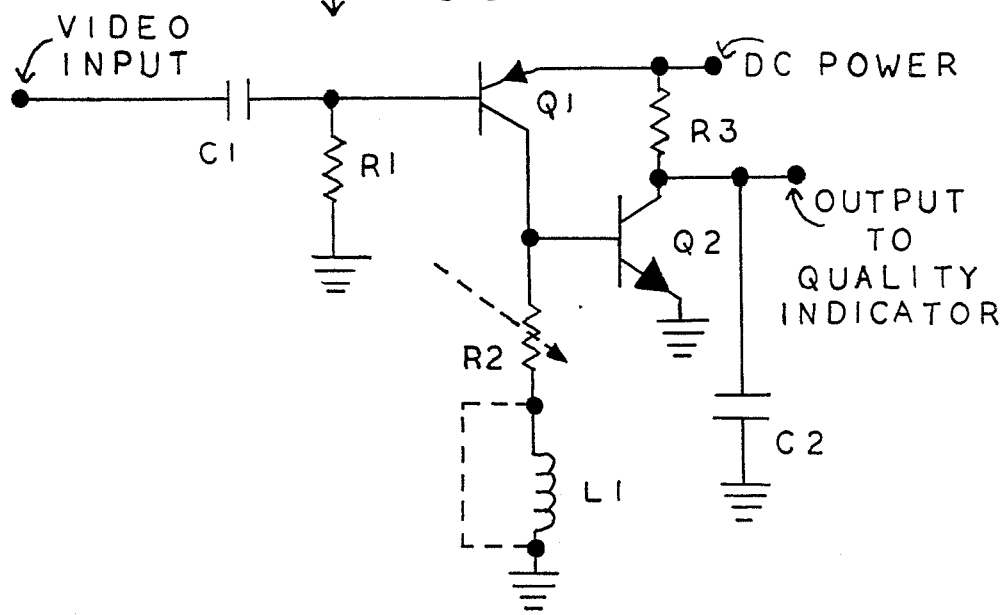
FIG. 1 shows circuitry that will convert the noise in the tips of horizontal sync pulses to a noise level indicating voltage.

In this embodiment of the present invention, FIG. 1 shows an abnormal transistor sync separator used to separate the sync pulses from the video signal. This separator does not saturate the transistor collector.

Normally, the sync separator output collector will saturate so as to produce nice "clean" sync pulses and leave the noise behind. Standard sync separators desire this cleaning up, but this embodiment wants just the opposite, that is leaving most of the sync behind, and extracting the noise contained in the tips of the sync.

The sync separator output collector load is changed from the normal value so that the output voltage does not saturate for any level of video drive signal encountered. This can be easily done by making the load resistor low, perhaps on the order of 5 to 50 ohms, or changing it to an inductor, which would combine hi pass frequency filtering in the sync separator itself. This low value resistor may be made user adjustable for additional benefit, and may also be used in series with the mentioned inductor to leave a portion of the "D.C." for "gating" or biasing the next stage.

Figure 2:
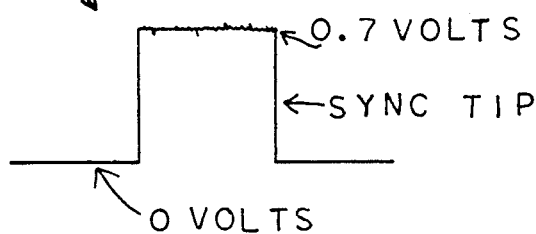
FIG. 2 shows a typical waveform appearing at the collector of sync separator Q1 of FIG. 1, when a 'clean' video signal is present.
Figure 2A:
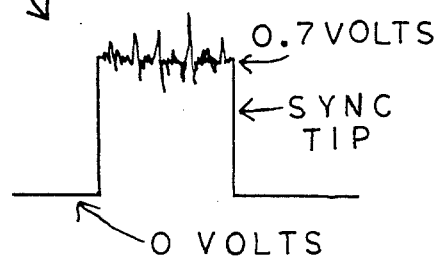
FIG. 2A shows a typical waveform appearing at the collector of sync separator Q1 of FIG. 1, when a 'noisy' video signal is present.

The resulting sync separator output waveform (resistor load) for a typical high quality signal is shown in FIG. 2, and the waveform for a poorer quality signal is shown in FIG. 2A. Instead of the tops of the pulses being "flat", due to collector saturation of Q1, the tops of each pulse contains an amount of A.C. noise. This is because the input noise of just the sync tips is amplified to a significant level. It must be noted of course that if the video signal was exceptionally "clean", then the tops of the sync pulses would be nearly completely flat.

These tips will be processed by following circuitry to establish a GRADING SCALE for the video signal.

Many combinations of processing are possible, through amplifying, frequency bandpassing, filtering, gating, etc., or a combination of them, to achieve a higher level of sophistication in isolating the spectrum noise signal. A discussion of even a percentage of all the possibilities is beyond the scope of this disclosure, and this processing is previously known art.

A basic circuit to illustrate the principles involved is shown in FIG. 1.

C1, R1, and Q1 are the familiar input capacitor, bias resistor, and sync separator transistor. R2 however is much lower in value then normal to prevent saturation in Q1, and C2 can be on the order of one micro-farad to filter out the A.C. content of the signal. FIG. 2 shows a typical horizontal sync pulse that is output by Q1. Instead of the pulse height being high, almost to the level of the emitter (supply voltage), the low impedance of R2 is adjusted to reduce the pulse height to approximately 0.7 volts so that substantially only the A.C. noise content riding on the top of the pulse will cause conduction in Q2. Since Q2 is nearly "off" unless spectrum noise is present (some slight noise free conduction would be used as a "clean" reference), its collector stays near the supply voltage until noise is detected.

The collector of Q2 contains what is effectively a low pass filter (R3-C2), to convert the noise "bursts" to a D.C. level proportional to the level of that noise for subsequent indicating circuitry.

Due to the filtering action of C2, the collector of Q2, is effectively a D.C. signal whose level varies from almost the supply voltage for a very "clean" video signal, to a lower value as the noise content of the video signal increases.

It is of course now a very straight-forward matter to send this signal on to a video quality indicator.

This could be a simple needle pointer type meter or an LED "bar" display could be used, etc. The indicator can be simply a single LED, or as complex as desired, even being a relay to stop or start some other equipment at a particular noise content level.

FIG. 1 is a simplified circuit to easily explain the invention. The circuitry should accomplish the following to adhere to the spirit of this embodiment:

Some section of the video signal that would be ideally "flat", that is would produce a flat line when viewed on an oscilloscope, is chosen to be the sample to evaluate. That portion is separated, and as is usually required, amplified to extract its noise content.

Since an amplified flat section will still be flat, and a section containing noise will now have amplified noise, a signal will appear at the output of the sync separator that ranges from virtually noise free (flat), to very noisy (high A.C. content), depending on the amount of noise present in the sample, and can be graded for quality. The lower the A.C. content, the higher the quality.

The sync tips are ideally suited for the video sample, because they are ideally flat, and even a simple sync separator can be designed to both isolate and amplify them.

The sample signal may be additionally processed for such things as frequency content, etc. to further isolate the noise spectrum, and achieve any level of sophistication desired, both in the type of noise sensed, and subsequent indicator of quality.

It should be pointed out that given the simplicity of FIG. 1, and the configuration of the circuit, it would not be at all surprising to find the exact configuration of FIG. 1 (with different parts values) contained in some television receiver schematic somewhere, where Q1 and Q2 would be labeled as sync separator, and sync amplifier, respectively.

With both R2 changed to 1000 ohms, and C2 made small, say in the pico-farad range, and no inductor used, then FIG. 1 would indeed separate and output a nice "clean" composite sync signal, free of all noise. This is just the opposite of what this embodiment does.

It is naturally hoped that the radical differences made by changing these two parts would not be considered as obvious, as there is no teachings of this in these circuits, and the lack of availability of a low cost video signal to noise ratio meter, or video quality indicator would also seem to imply that.

As a final note to the discussion of this embodiment, it should also be pointed out that when R2 is either changed to, or used with an inductor to further boost the spectrum noise, then the differences become even more striking.

Figure 3:
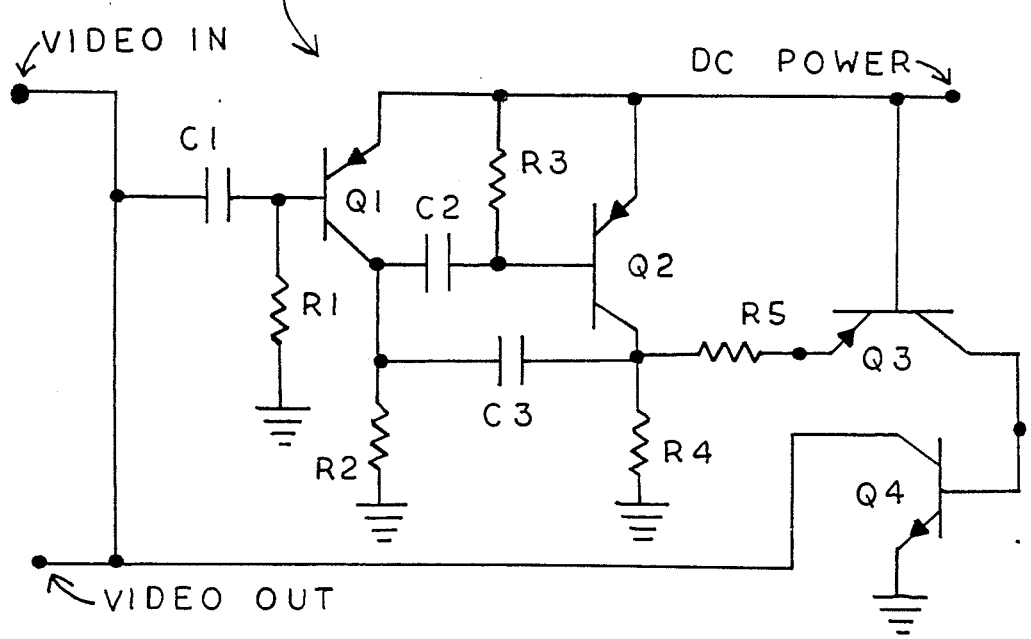
FIG. 3 shows circuitry that will detect and remove impulse noise from a base band video signal.

Impulse noise is processed in this embodiment. As shown in FIG. 3, the video input terminal is tied directly to the video output terminal. This eliminates any possible distortion or added noise that might be introduced by any sort of an amplifier or emitter follower, and of course also eliminates the cost of manufacturing it.

Again, an abnormal although altogether different sync separator is used. The signal is coupled to the base of the abnormal sync separator Q1 via C1. The unusual output signal of Q1 across R2 is shown just before and just after the vertical sync time in FIG. 4. As is shown, the waveform is missing most of the vertical sync signal and its serrations due to the circuit configuration and the bias on Q1 as well as the circuit values chosen. This circuit AUTOMATICALLY eliminates the need for a vertical sync detector and additional circuitry to isolate the three scanning lines containing the broad vertical sync pulses since it is simply already missing at the output of Q1.

Thus far, the video input signal has been directed to the video output, and a signal containing all the horizontal sync pulses with the otherwise interfering vertical serrations missing is available for use. Next, any extra pulses that do not belong will be detected.

As shown in FIG. 3, the collector of Q1 is coupled to the base of Q2 via capacitor C2. Q2 is biased off by resistor R3, and its output is coupled collector to collector back to Q1 via C3.

The circuit action is as follows. Prior to the arrival of a normal horizontal sync pulse C2 is about fully charged. When a sync tip first arrives (leading edge) at the base of Q1, the collector of Q1 goes high as Q1 conducts. This rise is coupled via C2 to the base of Q2, but is of the opposite polarity for conduction in Q2. The values chosen for C2 and R3 cause C2 to discharge appreciably during the first microseconds of the sync tip time.

Thus, when the collector of Q1 returns low, Q2 now conducts, as C2 becomes recharged through the base of Q2 by R2.

Consider now the effect of C3 on the collector voltage waveform of Q2 for a normal horizontal sync pulse. As has been shown, when the leading edge of the sync tip pulse arrives, Q2 is off and stays off as the collector of Q1 rises. The voltage rise at the Q1 collector is coupled directly to the collector of Q2 via C3.

As a result of conduction in Q1, NOT by conduction in Q2, the collector voltage of Q2 rises, but still does not significantly exceed that of the emitter of Q2 because during normal camera time C3 had been discharged by the action of R2 and R4.

At the time when the tip of this normal horizontal sync pulse leaves (trailing edge), Q2 conducts, now causing C3 to charge up through R2.

Thus, while the collector of Q1 has returned low, the collector of Q2 has remained high, due to the trailing edge conduction of Q2.

Now, when Q2 turns off, after the trailing edge of the sync pulse, the collector of Q2 begins to fall as C3 once again discharges through R2 and R4, and will be sufficiently discharged by the time the next normal horizontal sync pulse arrives.

This is now a most critical time, beginning just after the trailing edge of a sync pulse.

C3 is charged, has not yet had time to discharge, and any noise pulses that arrive before it has discharged sufficiently will cause the charge on C3 to be added to the voltage of the Q1 collector and thus cause the voltage at the collector of Q2 to exceed that of the emitter of Q2 sufficiently to allow conduction in Q3, and very importantly to cause Q3 to conduct starting at the LEADING EDGE of ONLY the unwanted noise pulses.

The collector voltage of Q2 is coupled to the emitter of Q3 via R5. The base of Q3 is connected to the emitter of Q2 (the D.C. power source line).

The only time Q3 can conduct is when its emitter voltage exceeds its base voltage. As has been shown, this occurs only when extra unwanted pulses are present.

The resulting output voltage at the Q3 collector is exactly the desired signal needed to effect the removal of the extra pulses. It is a waveform of one or more positive pulses that occur ONLY when unwanted noise pulses are present.

When a normal video tape is played back past the invention (remember, the video line need not be cut), only one small short duration pulse appears at the collector of Q3 to mark, and coincides with, the head switching noise pulse. No other signal at all appears at the collector of Q3 when a normal tape in good condition is used.

Examine what has now been accomplished so far with just three transistors.

The collector of Q3 has a single pulse, or a series of pulses that follow exactly the pattern of the unwanted extra pulses in the original video signal. When a given horizontal scanning line contains any extra pulses, a positive pulse appears at the collector of Q3 to represent it, leading edge for leading edge. When a given scanning line contains no extra pulses, there is no pulse present at the collector of Q3. When a given scanning line contains five extra pulses, the collector of Q3 contains five corresponding pulses to match them, and so on.

Finally, the importance of the missing vertical sync pulse at the collector of Q1 can be more fully explained.

Since the vertical sync pulses have serrations in them, the second half of each of the three vertical sync, or broad pulses would be interpreted by the circuit as extra noise that did not belong there, and generate a pulse signal at the collector of Q3. Since the vertical sync is not passed by Q1, this does not occur.

With most of the task now accomplished, namely isolating a signal representing the unwanted noise pulses, and ONLY that, all that remains now is to couple this signal on to a final stage to correct the video itself.

My previous U.S. Pat. No. 4,467,358, issued Aug. 21, 1984, shows simple methods of "crushing" a video line flat to any desired value.

The simplest one of those methods utilizes only a single transistor, and is suitable for use here.

Transistor Q4 of FIG. 3 serves this function. When its base is driven positive, the video line is literally crushed to a very low level near zero volts D.C.

The normal sync tip level is always well below this value, and this simple method does not require any knowledge about the exact level of the video signal.

The short duration pulse output of Q3 can be extended by the use of an additional capacitor to ground at the collector of Q3 to also remove any positive signal that directly follows, or if desired, it can be extended to as much as about 50 microseconds for crushing an entire scanning line flat upon the appearance of even one unwanted noise pulse. Also, the output of Q3 can be coupled to a one shot first, and then coupling the one shot to Q4 instead of coupling the output of Q3 directly to Q4.

The following circuit values are shown for a 9 volt power voltage for FIG. 3. R1-180K, R2-1K, R3-27K, R4-15K, R5-1K, C1-.02uf, C2-30pf, C3-470pf.

Figure 5A:
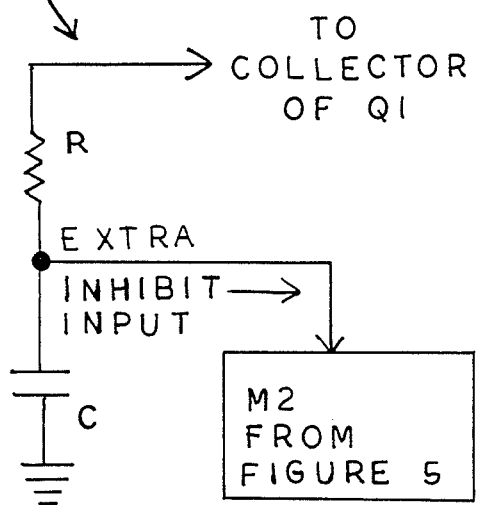
FIG. 5A shows a simple addition that is made to the circuitry of FIG. 5, to allow the use of a standard sync separator.
Figure 5:
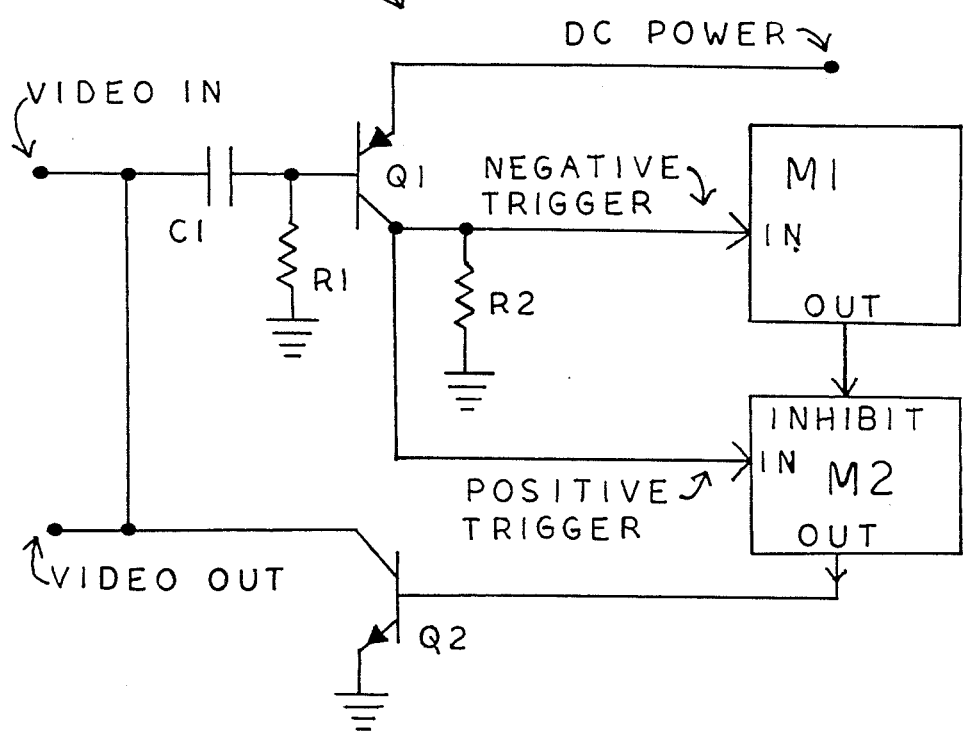
FIG. 5 shows circuitry that will detect and remove impulse noise from a base band video signal.

The circuit of FIG. 5 can be used in accordance with a third embodiment of the present invention.

The two monostable multivibrators shown will be referred to as M1, and M2, to distinguish between them.

M1 has an input responsive to negative transitions to trigger, and M2 has an input responsive to positive transitions to trigger.

M2 also has an input that will hold it in an inhibited state unresponsive to any transitions of its positive input.

Figure 4:
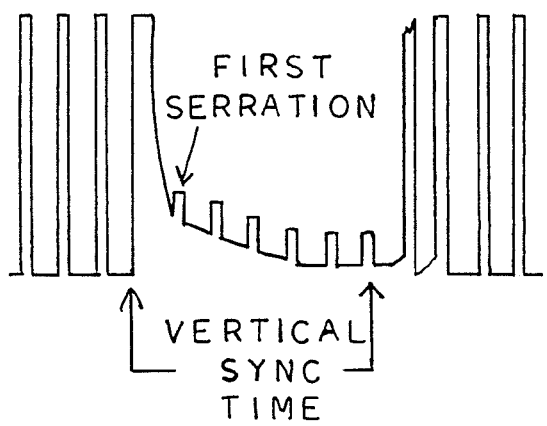
FIG. 4 shows a typical waveform appearing near the vertical sync time, at the collector of sync separator Q1 of FIG. 3. This waveform can also appear at the collector of sync separator Q1 of FIG. 5.

Here, C1, R1, Q1, and R2 function as described previously, and the collector of Q1 once again has the output waveform of FIG. 4, and for the same reasons.

The output of Q1 is coupled simultaneously to the inputs of both of the multivibrators. To the negative responsive input of M1, and to the positive responsive input of M2.

Further, the output of M1 is connected to an inhibit input of M2, so that M2 is unresponsive to its trigger input except during the times that M1 is in its timing cycle.

Since the negative transition trigger of M1 is connected to the output of Q1, it will trigger on the falling voltage at the collector of Q1, when the normal sync tip leaves Q1 (trailing edge). M1 can stay in its timing state for as long as about 50 microseconds, which corresponds to about the scanning time between normal sync pulses.

Since M2 was inhibited when the voltage at the collector of Q1 first rose at the start of the normal sync tip (leading edge), it did not trigger.

When M1 triggered at the end of the normal sync tip (trailing edge), it enabled M2, but the M2 input used is not responsive to falling transitions, and so once again it did not trigger.

M2 has now been enabled, and the leading edge of any unwanted EXTRA noise pulse will cause M2 to trigger.

Since the output of M2 is coupled to the base of Q2, the video line will be crushed flat for the duration of the M2 timing cycle whenever M2 triggers.

Once again, this can be set to crush only a few microseconds or an entire scanning line, as desired.

If only a few microseconds has been chosen, then M2 can trigger again several times during the same scanning line, if more than one noise pulse is present.

Eventually, M1 times out, and M2 is once again inhibited from triggering on the positive transition of the Q1 collector voltage. This prevents the normal sync from triggering M2, and so the process repeats, for every single scanning line.

Yet another embodiment of the present invention can utilize a completely standard sync separator if that is desired, such as when the invention is to be added to existing equipment (see FIG. 5A).

M1 and M2 are the same as described above, except that either M1 or M2 has an additional inhibit input. M2 is chosen for illustration, but M1 could have been used instead.

A resistor R and a capacitor C which comprise a familiar vertical sync integrator is connected to the additional inhibit input of M2.

The voltage at this additional inhibit pin must rise above its inhibit level before the first serration of the broad vertical sync pulse, (about 30 micro-seconds), and this is quite easily accomplished with normal values for R and C of FIG. 5A.

If M2 is inhibited prior to the rising (trailing) edge of the first serration, then M2 will not respond to it.

In similar fashion had M1 been chosen for this inhibit function, then it would not have responded to the falling (leading) edge of the first serration.

This prevents the serrations of the broad vertical sync pulses from being interpreted as extra unwanted noise.

The rest of the circuit performs as previously described, but allows for the use of a standard sync separator.

The utter simplicity of FIG. 3 and FIG. 5, and the ability to remain completely inactive in the absence of unwanted signals as well as the ability to automatically become active anywhere in the video field when it's needed, should illustrate the advantages of the present invention over any prior art designs.

It is recognized that modifications and variations to the enclosed embodiments of the present invention may readily occur to those skilled in the art and, consequently it is intended that the claims be interpreted to cover such modifications and equivalents.

What is claimed is:

1. A circuit to measure the noise content of a base band video signal comprising:
   a first means to separate the tips of the sync pulses from a composite video signal without limiting them so as to preserve the noise content contained in said tips of said sync pulses;
   a second means to separate said noise content from said tips of said sync pulses; and
   a third means to convert said noise content to an indication signal that varies in proportion to the amount of said noise content present, whereby said base band video signal may be evaluated.

2. The circuit described in claim 1 wherein:
   said first means is a transistor with a low value collector load resistor, to prevent said transistor from saturating, and losing the noise content contained in said tips of said sync pulses.

3. The circuit described in claim 1 wherein:
   said first means is a transistor with an inductor in its collector load to enhance the high frequency noise content in said sync tips by presenting a higher impedance collector load at the frequency of the said noise content.

4. A circuit to remove unwanted extra pulses occurring between the normal horizontal sync pulses anywhere in the total field of a video signal, comprising:
- a sync separator first means normally passing the horizontal sync pulses, and blocking the serrations of the vertical sync pulses;
- a second means responsive to said first means that has an output to activate a third means only when said extra pulses are present between said normal horizontal sync pulses; and
- a said third means responsive to said second means to substantially remove said extra pulses from said video signal while activated, whereby said extra pulses cannot disturb equipment processing said video signal.

5. The circuit described in claim 4 wherein:
at least one of said extra pulses is caused by noise created by playback errors of a video tape.

6. The circuit described in claim 4 wherein:
at least one of said extra pulses is intentionally placed in said video signal.

7. A circuit to remove unwanted extra pulses occurring between the normal horizontal sync pulses anywhere in the total field of a video signal, comprising:
- a first means responsive to the normal horizontal sync pulses of said video signal, to enable a second means to be responsive to any extra pulses for a period of time between said normal horizontal sync pulses anywhere in the total field of said video signal;
- a said second means unresponsive to said normal horizontal sync pulses while inhibited, but responsive to said extra pulses occurring between said normal horizontal sync pulses while enabled, to activate a third means for a period of time; and
- a said third means responsive to said second means to remove said extra pulses from said video signal while activated, whereby said extra pulses cannot disturb equipment processing said video signal.

8. The circuit described in claim 7 wherein:
at least one of said extra pulses are caused by noise created by playback errors of a video tape.

9. The circuit described in claim 7 wherein:
at least one of said extra pulses are intentionally placed in said video signal.

10. The circuit described in claim 7 wherein:
said third means is not activated for the vertical sync time.

11. The circuit described in claim 7 wherein:
said second means is inhibited for most of the vertical sync time.

12. The circuit described in claim 7 wherein:
said first means is inhibited for most of the vertical sync time.

* * * * *